United States Patent

[11] 3,624,360

[72] Inventors John Covell Collier
Farnworth;
Leonard John Owen, Edgware; David
William Rickards, Stanmore, all of England

[21] Appl. No. 883,077
[22] Filed Dec. 8, 1969
[45] Patented Nov. 30, 1971
[73] Assignee AMP Incorporated
Harrisburg, Pa.
[32] Priority Dec. 9, 1968
[33] Great Britain
[31] 58,263/69

[54] CARD READER AND TRANSPORTER APPARATUS
5 Claims, 3 Drawing Figs.

[52] U.S. Cl. 23/61.11 R, 235/61.11 B, 200/46, 340/149 A
[51] Int. Cl. G06k 13/07, H01h 43/08, H04g 1/30
[50] Field of Search 200/46; 235/61.11, 61.112, 61.11 R, 61.11 B; 340/149 A

[56] References Cited

UNITED STATES PATENTS

| | | | |
|---|---|---|---|
| 2,967,916 | 1/1961 | Williams | 200/5 |
| 3,018,947 | 1/1962 | Harruff | 235/61.11 C |
| 3,114,150 | 12/1963 | Calano | 346/74 |
| 3,124,674 | 3/1964 | Edwards | 235/61.1 |
| 3,227,444 | 1/1966 | Egan | 235/61.11 X |
| 3,353,006 | 11/1967 | Pollock | 235/61.7 B |
| 3,355,576 | 11/1967 | Childer | 235/61.7 |
| 3,487,905 | 1/1970 | James | 235/61.9 |
| 3,519,767 | 7/1970 | Sinker | 200/46 |

*Primary Examiner*—Maynard R. Wilbur
*Assistant Examiner*—Robert M. Kilgore
*Attorneys*—Curtis, Morris and Safford, William J. Keating, William Hintze, Frederick W. Raring, John R. Hopkins, Adrian J. La Rue and Jay L. Seitchik

ABSTRACT: A card reader is provided with drive rollers which feed a card to a reading position. When the card is in the reading position it is closed to a reading head. Depending on the result of the data read, the card is either rejected from the reader or transported through it. Microswitches control the drive rollers and reading operation.

Inventors

JOHN COVELL COLLIER

LEONARD JOHN OWEN

DAVID WILLIAM RICKARDS

By: Adrian J. LaRue

Inventors
JOHN COVELL COLLIER
LEONARD JOHN OWEN
DAVID WILLIAM RICKARDS
By: Adrian J. LaRue

CARD READER AND TRANSPORTER APPARATUS

This invention relates to a card reader and transporter apparatus.

A card for use in such apparatus carries information in the form of a pattern of punched holes or embossments and may be made of any suitable lamina material such as paper or plastics.

An object of the invention is to provide a card reader having transfer means to transfer a data card to a card-reading area so that information on the data card can be read thereat.

Another object is the provision of means provided by the card reader for operating the card reader to accept the data card upon the data card being validated.

A further object is to provide means to return the data card in the event the data card is not validated.

An additional object is the provision of a support on which a card to be read is positioned which includes means thereon operated by the card to position the card in a card-reading area and to move the support into position so that a reading head reads the information on the card.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

A card reader and transporter apparatus, according to the present invention, includes a reading head for reading information from a card, a support for the card, means for moving the support from a nonreading to a reading position, drive means for transporting the card across the support, and a stop member for locating the card in a reading position on the support and for controlling the drive means.

One embodiment of a card reader and transporter apparatus in accordance with the present invention will now be described, by way of example, with reference to the accompanying drawings.

The apparatus to be described is for use as a check validation device in a cash-dispensing system. The whole system, which is not illustrated, would include a central computer arrangement which contains details of customers' accounts or credit standing and this computer would be connected to a large number of terminal stations. Each terminal station would include a reader and transporter apparatus in accordance with the invention and a cash-dispensing apparatus. Each terminal apparatus is conveniently situated in a street, for example outside a bank, so that customers of the bank can obtain cash at any time whether the bank is open or closed on the presentation of a valid check at the terminal station. In order to prevent fraud, it is necessary that each check presented is scrutinized to ensure that it is genuine, is current, is properly completed and that funds are available in the account on which the check is drawn to meet the demand made. Only when this scrutiny has been satisfactorily completed will the terminal station dispense the cash. As the cash is dispensed, the check is passed into the apparatus and is not returned to the customer. If the computer decides for any reason that the check is invalid, it gives an instruction to the terminal station not to dispense cash and to return the check to the customer.

The check contains information in the form of a pattern of punched holes and thus constitutes a punched card. The information is read from the check by any convenient card-reading head which locates the positions of the holes and transmits this information back to the computer in the form of electrical signals. The check may additionally contain printed information and magnetic stripes for security checks.

The apparatus of the invention will form part of a terminal station and will transport a check to a reading head, read the information from the check, transmit the information to the computer and then, on receipt of an instruction from the computer, either pass the check through the apparatus into the device or reject the check and pass it back out of the apparatus.

Figure 1:
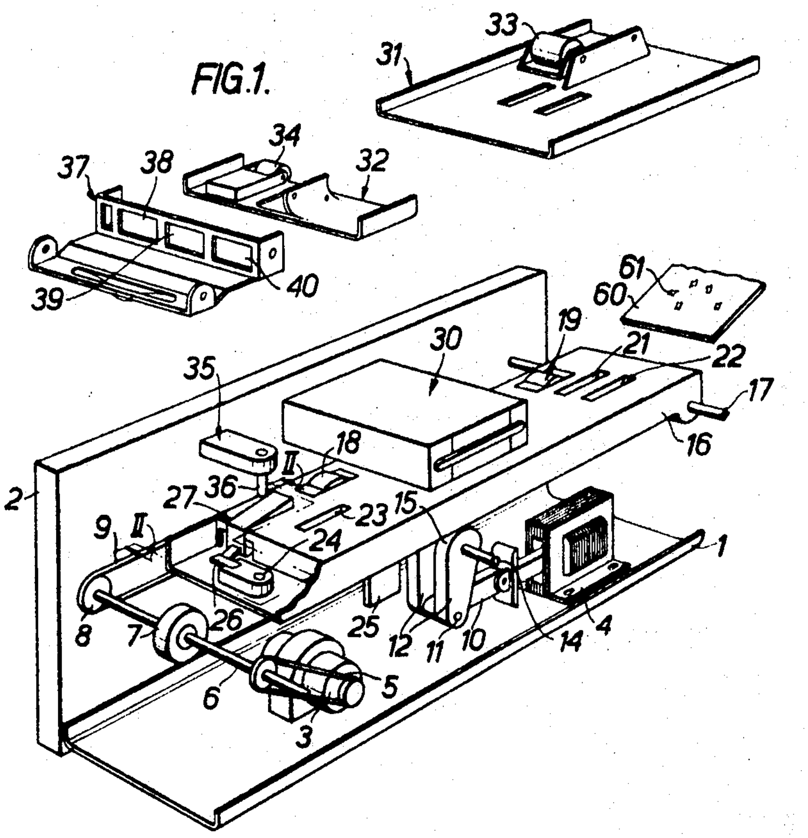
FIG. 1 is a perspective view of the apparatus with the cover removed and with certain parts exploded from the body of the apparatus.
Figure 2:
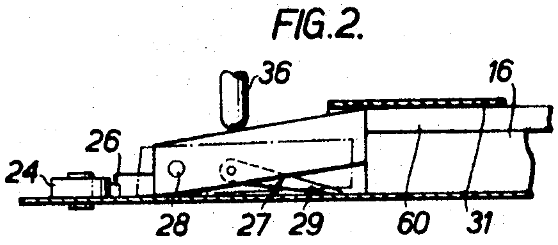
FIG. 2 is a sectional side view taken on the line II—II of FIG. 1.

Referring now to FIGS. 1 and 2 of the drawings, the apparatus comprises a baseplate 1 and two vertical sidewalls 2 of which only one is shown in FIG. 1. The baseplate 1 supports an electric motor 3 and a solenoid 4. The motor 3 is connected through a drive belt 5 to a main drive shaft 6 journaled in the walls 2. The drive shaft 6 carries a rubber-covered transport roller 7 and a sprocket 8 over which a drive chain 9 passes.

The solenoid 14 has an armature 10 pivotally connected at 11 to a rocker cam 12. The rocker cam 12 is mounted for pivotal movement on a shaft 14 secured between the sidewalls 2. The cam surface 15 of cam 12 engages the underside of a swing plate 16 which is pivotally suspended at the front end of the apparatus on a bar 17 mounted in the sidewalls 2. The swing plate 16 has two drive wheels 18, 19 extending through slots in its surface. The shafts (not shown) upon which the drive wheels 18, 19 are mounted extend from the side of the plate 16 and carry sprockets (not shown) over which the drive chain 9 passes to drive the wheels 18, 19. The drive wheels 18, 19 are rubber surfaced to provide a good grip on a check.

The swing plate 16 has two sensing microswitches 21,22 situated adjacent the bar 17 at the entrance of the apparatus, and a further microswitch 23 is positioned near the rear end of plate 16. Two other microswitches are also present in the apparatus one 24 at the end of the plate 16 and the other 25 beneath the plate 16. The microswitches 22,23 control the forward drive of a check through the apparatus, and microswitch 21 controls the reverse drive. Microswitch 24 has a spring-operating arm 26 which engages at its free end against a stop member 27. As can best be seen from FIG. 2, the stop member 27 is pivotally mounted at 28 and is spring biased upwardly by spring 29 so that normally an end thereof projects above the top surface of the swing plate 16. The stop member 27 is able to move a restricted distance in a direction along the length of plate 16 so that microswitch 24 can be operated through arm 26. However, due to the spring nature of arm 26, the stop member 27 is normally biased forward in the apparatus.

Above the swing plate 16 is positioned a reader head 30 which contains an array of electrical contacts and sensor members which can detect the positions of holes in the check and translate the information represented by the positions of the holes into an electrical signal pattern. Two guide plates 31,32 are positioned at either end of the reader head 30. Each plate is secured to the sidewalls 2 and includes an idler wheel 33,34 respectively, which cooperates with a corresponding drive wheel 18,19. At the rear of the plate 32, a bracket 35 extends from one sidewall 2 over the stop member 27. This bracket 35 carries a downwardly projecting arm 36. A further bracket 37 is secured to the sidewalls 2 at the rear of the apparatus and bracket 37 has three holes 38,39,40 in it, in which holes relays (not shown) (38,39,40 in FIG. 3) are mounted.

Figure 3:
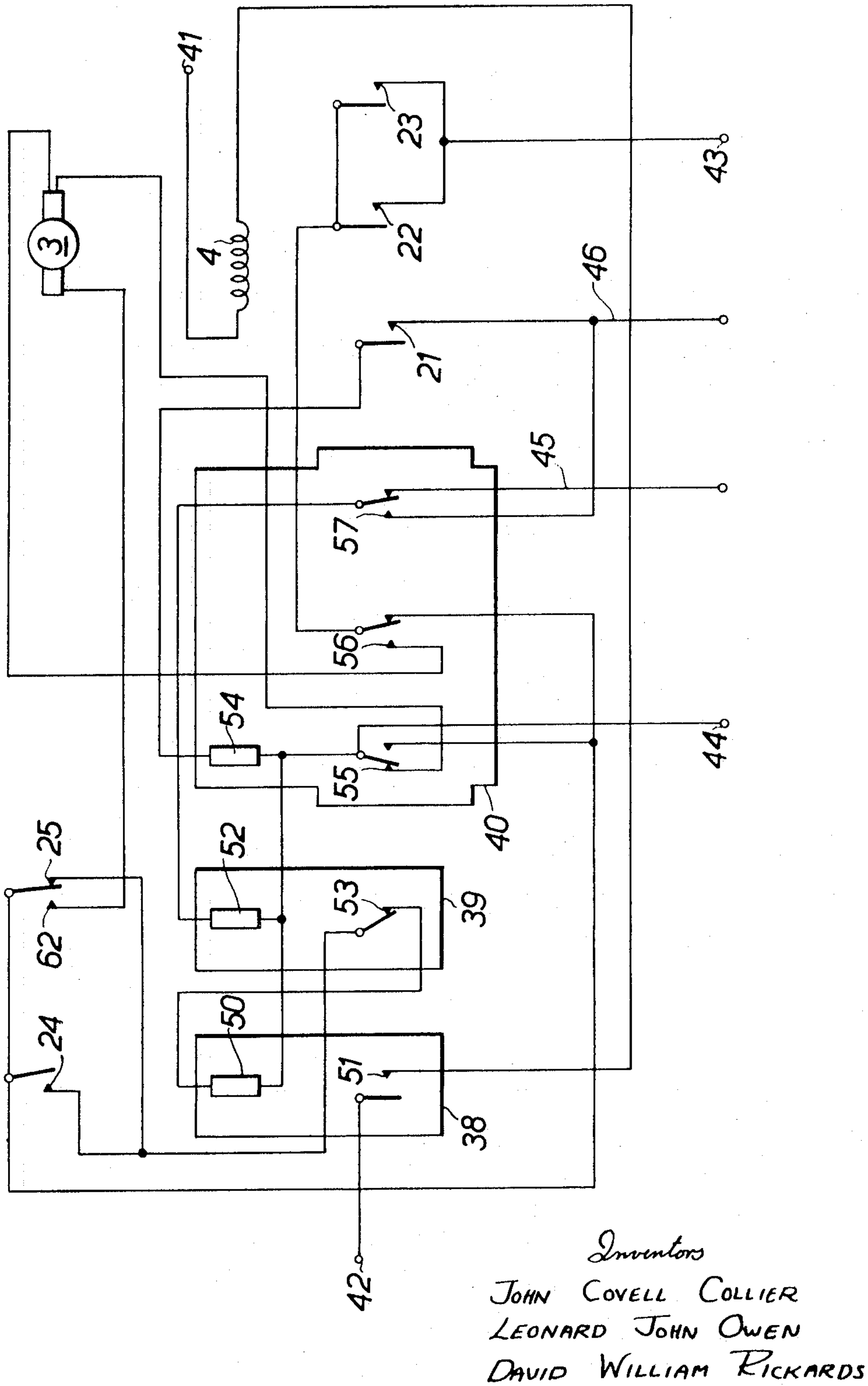
FIG. 3 is a circuit diagram of the apparatus.

Referring now also to FIG. 3 of the drawings, this figure shows the circuit diagram of the apparatus with the various components identified by the reference numerals of FIGS. 1 and 2. The solenoid 4 receives its power from two terminals 41,42 connected to a first power supply source. The motor 3 receives its power from a low-voltage second supply source connected to terminals 43,44. Two lines 45,46 are connected to the computer for receiving instructions from the computer. The circuit of the reader head is not shown, nor is its connection to the computer indicated. The relay 38 comprises a coil 50 and an associated set of normally open contacts 51 in the supply circuit of the solenoid 4. Relay 39 comprises a coil 52 connected to line 45 and a set of normally closed contacts 53 connected in the circuit of relay coil 50. Relay 40 comprises a coil 54 connected to computer line 46 and three sets of changeover contacts 55,56,57.

In operation, a card in the form of a check 60 carrying information in respect of the drawer is fed into the front of the apparatus. The check 60 is pushed onto the swing plate 16 and is guided by guide plate 31 until it passes between wheels 19 and 33 and closes microswitch 22. This closes the circuit from terminal 43 through the closed contacts 56 of relay 40 and the contact 62 of microswitch 25 to the motor 3, and from the motor 3 through normally closed contacts 55 of relay 40 to terminal 44. Contact 62 of microswitch 25 is normally open (as shown in FIG. 3) but is held closed by the weight of swing plate 16 which is at this time in its lowered position. The motor 3 when energized starts to rotate in a forward direction and through drive belt 5, main drive shaft 6, sprocket 8 and drive chain 9 rotates drive wheels 18,19 in a forward direction. The check 60 is thus driven forward over the top surface of the swing plate 16 and guided into a reading position below the head 30. When the leading edge of the check 60 engages stop member 27, it drives it rearwards against the spring action of arm 26 to operate the microswitch 24 and cause its contacts to close.

From FIG. 3 it will be seen that as the contacts of microswitch 24 close a circuit is completed from terminal 43 through microswitch 22, contacts 56 or relay 40, microswitch 24, relay contacts 53 and the coil 50 of relay 38 to terminal 44. As coil 50 is energized it closes contacts 51 to place solenoid 4 across the supply terminals 41,42. As solenoid 4 becomes energized it draws armature 10 into the body of the solenoid causing cam 12 to rock about pivot points 11 and 14. This rotates cam profile 15 under the swing plate 16, biasing the plate 16 upwards in a rotary movement about bar 17. As the plate 16 rises, it comes off microswitch 25 allowing the contacts of this switch to revert to their normally closed position. This changeover breaks the current supply to motor 3 and this ceases driving the check 60 through the apparatus, the changeover also completes a circuit for relay coil 50 through the normally closed contacts of microswitch 25 so that the solenoid 4 is held in by contacts 51 remaining closed.

The raising of the swing plate 16 brings the stop member 27 against the projecting arm 36. The arm 36 forces member 27 to pivot downwardly about 28 against spring 29 and to come out of engagement with the end of check 60. The spring arm 26 moves the stop member 27 forward under check 60. Since the motor 3 is no longer working, the check 60 remains in position when the stop member 27 is removed from against its end. The check 60 in this position is in the correct reading position, and as the plate 16 moves upwards, it brings the holes 61 into the area of the reader head 30. The sensor members in the reader head 30 monitor the holes 61 in the check 60 and transmit the information read to the computer in the form of an electrical signal pattern.

If the computer recognizes the signal pattern received as a valid one against which payment should be made, it transmits a signal to the cash-dispensing part of the terminal station to enable it to pay out the instructed amount, and it transmits a second signal to line 45 to operate the transporter part of the apparatus. The signal on line 45 instructs the apparatus not to reject the check but to accept it and pass it through the apparatus for retention. It does this by energizing relay coil 52 of relay 39 which causes contacts 53 to open breaking the circuit of coil 50. Coil 50 then becomes deenergized and contacts 51 open breaking the circuit of solenoid 4. Armature 10 is drawn out of solenoid 4 by a spring (not shown) rotating cam 12 to its original position and allowing swing plate 16 to fall about bar 17. As plate 16 falls, it closes the normally open contact 62 of microswitch 25 enabling the motor 3 to be reenergized and drive in a forward direction.

The presence of the check 60 holds the parallel contacts of microswitches 22,23 closed to ensure that the circuit between terminals 43,44 is complete. The check 60 is now driven forward through the apparatus and is not stopped by stop member 27 since this has been positioned below the check 60. As the check is driven forward, microswitch 22 is first released to open its contacts, the motor circuit being maintained through microswitch 23. When the check 60 has been driven through the apparatus by drive wheel 18 and wheel 34, it falls into a catchment area behind the apparatus. Microswitch 23 is no longer held closed and reverts to its normally open contact position breaking the motor circuit and discontinuing the drive. Stop member 27 is no longer held down and rises under the influence of spring 29 to its raised position. The apparatus is now ready for the next transaction.

If the computer had not recognized the signal pattern sent by the reader head 30, it would have issued a reject instruction signal over line 46. This signal would have been passed through the normally open contacts of microswitch 21, now held closed by the presence of the check 60, to energize coil 54 of relay 40. The energization of coil 54 causes contacts 55,56,57 to change over. As contacts 57 change over, the signal on line 46 is sent through coil 52 of relay 39 to energize this coil and open contacts 53, breaking the supply to coil 50 and consequently to solenoid 4. The changeover contacts 55,56 complete a circuit to the motor 3 through microswitches 22,23 (held closed by the check 60) and contact 62 of microswitch 25 (held closed by the swing plate 16). The polarity of the current applied to the motor is reversed through the changeover switches and consequently the motor 3 drives in the reverse direction to reject the check 60 from the apparatus. It can then be checked by the inserter or a different check inserted.

The contacts 51 for controlling the solenoid 4 can alternatively be made to drop out by arranging that the polarity of the current supplied to the coil 50 reverses when the coil 54 is energized. In such a case, the changeover contact 57 of relay 40, which is connected to line 46, can be dispensed with.

It will, therefore, be appreciated that the aforementioned and other desirable objects have been achieved; however, it should be emphasized that the particular embodiment of the invention, which is shown and described herein, is intended as merely illustrative and not as restrictive of the invention.

The invention is claimed in accordance with the following:

1. A card reader apparatus comprising a reading head for reading information from a card, a support for the card, means for moving the support from a nonreading to a reading position, reversible drive means for transporting the card across the support, a stop member for locating the card in a reading position on the support, means for causing the support to be moved from its nonreading to its reading position upon the card engaging the stop member, means for stopping the drive means upon the card engaging the stop member and reject means responsive to an input signal received by the apparatus as a result of reading the card, to return the support to its nonreading position and to effect the reverse operation of the drive means to eject the card from the apparatus.

2. Apparatus according to claim 1, in which the drive means comprises a plurality of drive wheels extending through the support to engage a card on the support and a reversible electric motor for driving the wheels through a drive chain.

3. Apparatus according to claim 1, in which the stop member comprises a spring-biased arm arranged to be engaged by the leading edge of a card transported across the support when in its nonreading position and being arranged to be moved against spring bias by the card to move the support from its nonreading to its reading position to effect operation of an electrical switch to cause the drive means to be rendered inoperative and to effect movement of the leading edge of the card out of engagement with the stop member.

4. Apparatus according to claim 3, comprising accept means responsive to an input signal received by the apparatus as a result of reading the card, means actuable by the accept means to effect return movement of the support from its reading to its nonreading position and means responsive to the accept means to actuate the drive means in its forward direction.

5. Apparatus according to claim 1, in which the support is a swing plate mounted for rotary movement about an axis adjacent one end of the swing plate towards and away from the reading head, the means for moving the support from its reading to its nonreading position comprising a rocker cam mounted for pivotal movement about an axis extending at right angles to the direction of movement of the card across the support and having a cam surface engaging the support, the rocker cam being pivoted at its end remote from the said axis to a solenoid armature connected to a solenoid mounted on a platform extending parallel to the card support upon the side of the card support opposite to its card-supporting side.

* * * * *